United States Patent [19]

Musch et al.

[11] Patent Number: 4,482,676

[45] Date of Patent: Nov. 13, 1984

[54] PRODUCTION OF SULFUR-MODIFIED SOLID CHLOROPRENE RUBBERS

[75] Inventors: Rüdiger Musch, Bergisch-Gladbach; Wilhelm Göbel, Leverkusen; Eberhard Müller, Dormagen; Wolfgang Konter, Neuss, all of Fed. Rep. of Germany

[73] Assignee: Bayer Aktiengesellschaft, Leverkusen, Fed. Rep. of Germany

[21] Appl. No.: 473,697

[22] Filed: Mar. 9, 1983

[30] Foreign Application Priority Data

Mar. 20, 1982 [DE] Fed. Rep. of Germany ....... 3210285

[51] Int. Cl.³ .............................................. C08L 11/02
[52] U.S. Cl. ..................................... 525/215; 526/65; 526/294; 526/295
[58] Field of Search ........................... 526/65; 525/215

[56] References Cited

U.S. PATENT DOCUMENTS 3,079,359  2/1963  Stierli .................................. 525/215
3,752,785  8/1973  Smith .................................. 525/215

OTHER PUBLICATIONS

Catton, N. L., Neoprenes, E. I. Du Pont Co., 1953, pp. 201–203.

*Primary Examiner*—Christopher A. Henderson
*Attorney, Agent, or Firm*—Connolly and Hutz

[57] ABSTRACT

Vulcanizable, elastomeric chloroprene/sulfur copolymers having viscosities of from 60 to 35 ME, strengths of greater than 20 MPa and sulfur contents of from about 0.3 to 0.45% by weight are obtained by polymerizing chloroprene in the presence of from 0.05 to 0.40% by weight of sulfur to form a latex I, polymerizing chloroprene in the presence of from 0.5 to 1.5% by weight of sulfur to form a latex II, mixing latices I and II, optionally together with other sulfur-modified polychloroprene latices, in a ratio of from 4:1 to 1:4 (based in each case on solids) and peptizing the mixture, followed by working up to form the solid rubber, the percentages quoted being based on the quantity of monomer.

6 Claims, No Drawings

PRODUCTION OF SULFUR-MODIFIED SOLID CHLOROPRENE RUBBERS

This invention relates to a process for the production of a vulcanisable elastomeric chloroprenesulfur copolymer having a viscosity of from 68 to 35 ME, a strength of greater than 20 MPa and a sulfur content of from about 0.3 to 0.45% by weight in the mixture.

Sulfur-modified polychloroprene rubber has many valuable performance properties and, because of this, is widely used. In this connection, the fact that sulfur-modified polychloroprene rubber may readily be masticated and lends itself to vulcanisation without the addition of thiourea accelerators must be regarded as particularly advantageous. By virtue of its high dynamic strengths, the polymer is particularly suitable for such articles as V-belts and air bellows.

The properties of sulfur-modified chloroprene polymers are critically affected by the extent and nature of the sulfur-modification. If the sulfur content of the polymer is too low, the product, although showing high strength, can no longer be degraded by peptisation to a viscosity level which is favourable for processing. If the sulfur content is too high, the product obtained is unstable in its viscosity and gives vulcanisates with inadequate properties. For an average sulfur content in the mixture of from about 0.3 to 0.45% by weight, based on chloroprene, the requried viscosity range can only be obtained with difficulty using a special peptising agent (U.S. Pat. No. 2,755,074). However, the required strength cannot be obtained in this way.

The object of the present invention is provide a process by which it is possible to obtain sulfur-modified vulanisable solid polychloroprene rubbers which, for sulfur contents in the mixture of from about 0.3 to 0.45% by weight, have viscosities of from 68 to 35 ME after peptisation and strengths of greater than 20 MPa after vulcanisation.

According to the present invention, this object is achieved by polymerising chloroprene in aqueous emulsion in the presence of from 0.05 to 0.4% by weight of sulfur to form a latex I, polymerising chloroprene in aqueous emulsion in the presence of from 0.5 to 1.5% by weight of sulfur to form a latex II, reacting latices I and II, optionally together with other sulfur-modified polychloroprene latices, in a ratio of from 4:1 to 1:4 (based in each case on solids) and peptising the mixture in the usual way, followed by working up to form the solid rubber, the percentages quoted being based on the quantity of monomer. Peptisation and working up may be carried out, for example, in accordance with DE-OS No. 18 07 298.

Sulfur-modified polychloroprene rubbers having average sulfur contents of from about 0.3 to 0.45% by weight of sulfur are obtained by the process according to the invention using standard, readily obtainable peptising agents. If chloroprene is similarly reacted with this quantity of sulfur in a single-stage reaction, rubbers having the desired viscosity range are only obtained if special peptising agents are used. However, the strengths of the vulcanisates are always below 20 MPa.

The sulfur content indicated is always the actual quantity of sulfur used.

If latices I and II are separately peptised, subsequently mixed and then worked up together, the resulting rubbers show poorer raw material and vulcanisate properties, for example lower stability in storage and lower strength values, on account of a fairly significant reduction in viscosity.

Subsequent mixing of the solid polymers, for example on mixing rolls, is also unfavourable for the preparation of a vulcanisate mixture because the viscosity of the mixture undergoes a premature, undesirable recovery on account of the two-fold stressing which the material undergoes on the mixing rolls during preparation of the mixture and during incorporation of the additives.

In the context of this invention, chloroprene polymers are understood to be polymers in which up to 10% by weight of the chloroprene has been replaced by other monomers copolymerisable therewith, such as 2,3-dichlorobutadiene, 1-chlorobutadiene, butadiene, isoprene, acrylic acid, methacrylic acid, acrylonitrile or methacrylonitrile. Preferably, up to 5% by weight of the chloroprene is replaced by 2,3-dichlorobutadiene.

The molecular weight of the sulfur-modified polymers is generally adjusted by a so-called peptisation step carried out after polymerisation rather than by the addition of regulators during polymerisation. In the context of the invention, peptisation is understood to be the cleavage of the polymer chain at its sulfur segments. This step is necessary because the rubber can only be optimally processed in certain viscosity ranges. The peptising agent often used, tetraethyl thiuram disulfide (TETD), may be combined with nucleophilic substances, such as amines or dithiocarbamate (DE-OS No. 20 18 736, DE-AS No. 12 30 204). The latex obtained after polymerisation is normally peptised at 30° to 70° C. The velocity of the peptisation reaction is governed inter alia by the quantity of peptising agent used, by the type and quantity of nucleophilic substance used and by the temperature and pH-value of the latex. Degradation of the polymer may be carried out either in the latex or on the solid crude polymer, for example after low-temperature coagulation of the latex. In the case of polychloroprene rubbers having sulfur contents of from 0.3 to 0.45% by weight, it has not hitherto been possible to use TETD as a peptising agent for the production of products in the technologically favourable range.

If the solid polymer is stored at room temperature, the Mooney viscosity continues to fall slowly, passes through a minimum and then increases again. In the event of excessive peptisation in the latex phase, the Mooney viscosity of the polymer rises immediately, particularly if the rubber subsequently undergoes fairly significant thermal stressing. This effect is undesirable and may largely be eliminated by the addition of TETD immediately before the latex is worked up to form the solid rubber.

It has now been found that, after working up, the products obtained in accordance with the invention show excellent storage behaviour even with considerably smaller additions of TETD compared with chloroprene-sulfur copolymers having a comparable sulfur content.

EXAMPLE 1

Preparation of the polymer latices 990 g of chloroprene and 10 g of 2,3-dichlorobutadiene are emulsified in 1500 g of water to which 55 g of disproportionated resinic acid (solids content 70%), 5 g of the sodium salt of a naphthalene sulfonic acid/formaldehyde condensate, 5 g of sodium hydroxide, 3 g of anhydrous sodium pyrophosphate, 1 g of triisopropanolamine and 1 to 12 g of a sulfur dispersion (50%) have been added.

10 g of potassium persulfate and 0.2 g of sodium-$\beta$-anthraquinone sulfate dissolved in 490 g of water are prepared as the catalyst solution.

The emulsion is purged with nitrogen and heated to 50° C., after which polymerisation is initiated by the addition of the catalyst solution. More catalyst solution is added during the polymerisation reaction a quantity such that the temperature of the mixture does not exceed 50° C. After a monomer conversion of 65%, the polymerisation reaction is stopped by the addition of 1 g of phenothiazine or 7 g of TETD and the excess monomer is separated off by steam distillation under reduced pressure. The latex obtained has a solids concentration of from 26.5 to 27.0% by weight. The latices A to F contain the following quantities of sulfur in the mixture:

| Latex | A | B | C | D | E | F | G | |
|---|---|---|---|---|---|---|---|---|
| Sulphur dispersion (50%) | 1 | 2 | 3 | 4 | 7.2 | 9 | 12 | (g) |

EXAMPLES 2 TO 4

120 g of TETD are added to quantities of 40 kg of the phenothiazine-terminated latices, followed by peptisation at 40° C. The pH-value is then adjusted to <7 by the addition of acetic acid and, after the addition of another 145 g of TETD, the polymer is precipitated by low-temperature coagulation and then dried.

The sulfur contents and Mooney viscosities are shown in the following Table. Example 2 being a Comparison Example.

EXAMPLES 5 TO 9

100 g of dibutyl dithiocarbamate are added to quantities of 40 kg of the TETD-terminated latices and latex mixtures and, after 5 hours, the polymers are precipitated by low-temperature coagulation following the addition of another 180 g of TETD at a pH-value of <7 and then dried. The sulfur contents and Mooney viscosities are shown in the following Table, Example 5 being a Comparison Example.

| Example No. | % by weight of the latices in the mixture (solid on solid) | | | | | | | % by weight of sulfur, based on monomer | Mooney viscosities (ME) |
|---|---|---|---|---|---|---|---|---|---|
| | A | B | C | D | E | F | G | | |
| 2 | — | — | — | — | — | 100 | — | 0.45 | 99 |
| 3 | — | 30 | — | — | — | — | 70 | 0.45 | 52 |
| 4 | — | — | — | 40 | — | — | 60 | 0.44 | 50 |
| 5 | — | — | — | — | 100 | — | — | 0.36 | 58 |
| 6 | 23 | — | — | — | — | 77 | — | 0.36 | 58 |
| 7 | — | 26 | — | — | — | 74 | — | 0.36 | 56 |
| 8 | — | — | 30 | — | — | 70 | — | 0.36 | 54 |
| 9 | — | — | — | 36 | — | 64 | — | 0.36 | 54 |

EXAMPLES 10 TO 17

Strength of the vulcanisates

A polymer/carbon black mixture according to ISO standard No. 2475 is vulcanised in 3 stages at 150° C. (20-40 and 60 minutes). The strength of the corresponding samples is determined in accordance with DIN 53 455, the average value of the 3 stages being quoted in each case.

| Example No. | 10 | 11 | 12 | 13 | 14 | 15 | 16 | 17 |
|---|---|---|---|---|---|---|---|---|
| Polymer of Example No. | 2 | 3 | 4 | 5 | 6 | 7 | 8 | 9 |
| Strength (MPa) | 19.5 | 21.6 | 21.4 | 19.8 | 22.0 | 21.8 | 21.9 | 22.0 |

Examples 10 and 13 are Comparison Examples.

EXAMPLES 18 TO 22

Dynamic behaviour of the vulcanisates

The polymers are vulcanised in the same way as described in Examples 10 to 17 and crack formation is determined by the De Mattia method after aging for 7 days at 100° C. The long-term flex cracking test using a De Mattia machine is carried out in accordance with DIN 53 522. The number of kilocycles up to crack formation is evaluated for the stages specified in the Standard. In the present case, the kilocyles of all 3 stages are then averaged out.

| Example No. | 18 | 19 | 20 | 21 | 22 |
|---|---|---|---|---|---|
| Polymer of Example No. | 5 | 6 | 7 | 8 | 9 |
| Crack formation (kilocycles) | 243 | >500 | >500 | >500 | >500 |

Example 18 is a Comparison Example

We claim:
1. A process for the production of sulfur-modified, vulcanisable solid chloroprene rubbers having viscosities of from 68 to 35 ME and sulfur contents of from about 0.3 to 0.45% by weight, characterised in that chloroprene is polyermised in the presence of from 0.05 to 0.40% by weight of sulfur to form a latex I, chloro- prene is polymerised in the presence of from 0.5 to 1.5% by weight of sulfur to form a latex II, latices I and II are mixed, in a ratio of from 4:1 to 1:4 (based in each case on solids) and the mixture is peptised and worked up to form the solid rubber, the percentages quoted being based on the quantity of monomer.

2. A process as claimed in claim 1, characterised in that up to 10% by weight of the chloroprene is replaced by other copolymerisable monomers.

3. A process as claimed in claim 1, characterised in that up to 5% by weight of the chloroprene is replaced by 2,3-dichlorobutadiene.

4. A process in accordance with claim 1 further comprising adding at least one other sulfur-modified polychloroprene latice to the mixture before the mixture is peptized and worked up to form the solid rubber.

5. A process as claimed in claim 4, characterized in that up to 10% by weight of the chloroprene is replaced by other copolymerizable monomers.

6. A process as claimed in claim 4, characterized in that up to 5% by weight of the chloroprene is replaced by 2,3-dichlorobutadiene.

* * * * *